United States Patent [19]

Storer

[11] Patent Number: 4,984,471

[45] Date of Patent: Jan. 15, 1991

[54] FORCE TRANSMITTING MECHANISM FOR A VORTEX FLOWMETER

[75] Inventor: William J. A. Storer, Loveland, Colo.

[73] Assignee: Fisher Controls International, Inc., Clayton, Mo.

[21] Appl. No.: 404,602

[22] Filed: Sep. 8, 1989

[51] Int. Cl.$^5$ ............................................. G01F 1/32
[52] U.S. Cl. .................................................. 73/861.24
[58] Field of Search ........................... 73/861.22, 861.24

[56] References Cited

U.S. PATENT DOCUMENTS

| | | | |
|---|---|---|---|
| 4,033,189 | 7/1977 | Herzl et al. | 73/861.24 |
| 4,181,020 | 1/1980 | Herzl | 73/194 |
| 4,226,117 | 10/1980 | Herzl | 73/861.22 |
| 4,248,098 | 2/1981 | Sawayama et al. | 73/861.24 |
| 4,262,544 | 4/1981 | Herzl | 73/861.24 |
| 4,470,310 | 9/1984 | Tsuruoka et al. | 73/861.24 |
| 4,520,678 | 6/1985 | Koziol et al. | 73/861.24 |
| 4,526,040 | 7/1985 | Matsubara | 73/861.24 |
| 4,699,012 | 10/1987 | Lew et al. | 73/861.24 |
| 4,703,659 | 11/1987 | Lew et al. | 73/861.24 |
| 4,706,503 | 11/1987 | Kamentser | 73/861.24 |
| 4,791,818 | 12/1988 | Wilde | 73/861.24 |

FOREIGN PATENT DOCUMENTS 8902580  3/1989  PCT Int'l Appl. .............. 73/861.24

*Primary Examiner*—Herbert Goldstein
*Attorney, Agent, or Firm*—Marshall, O'Toole, Gerstein, Murray & Bicknell

[57] ABSTRACT

A force sensing and transmitting mechanism for a vortex flowmeter which includes a force sensing beam at one end, a force transmitting beam at the other end, and a thin plate joining the two together. The force sensing beam is disposed in the passageway flow path adjacent a vortex generator. The force transmitting beam projects outside of the passageway. The adjoining plate includes a central portion fixed to the sensor beam and the transmitting beam and with outer plate edges fixed to the housing to provide a first pivot point. A second pivot point is provided at the opposite end of the force transmitting beam and transducer means are mounted at the second pivot point to detect rotational deflection of the force transmitting beam corresponding to vortex induced pressure differentials. The second pivot point includes a rocker member rigidly attached to the force transmitting beam and having a V-shaped groove in engaging contact mating with V-shaped projections fixed to the housing. Rotational deflection of the force transmitting beam tends to rockingly deflect the rocker member on the V-shaped projections corresponding to vortex induced pressure differentials.

10 Claims, 3 Drawing Sheets

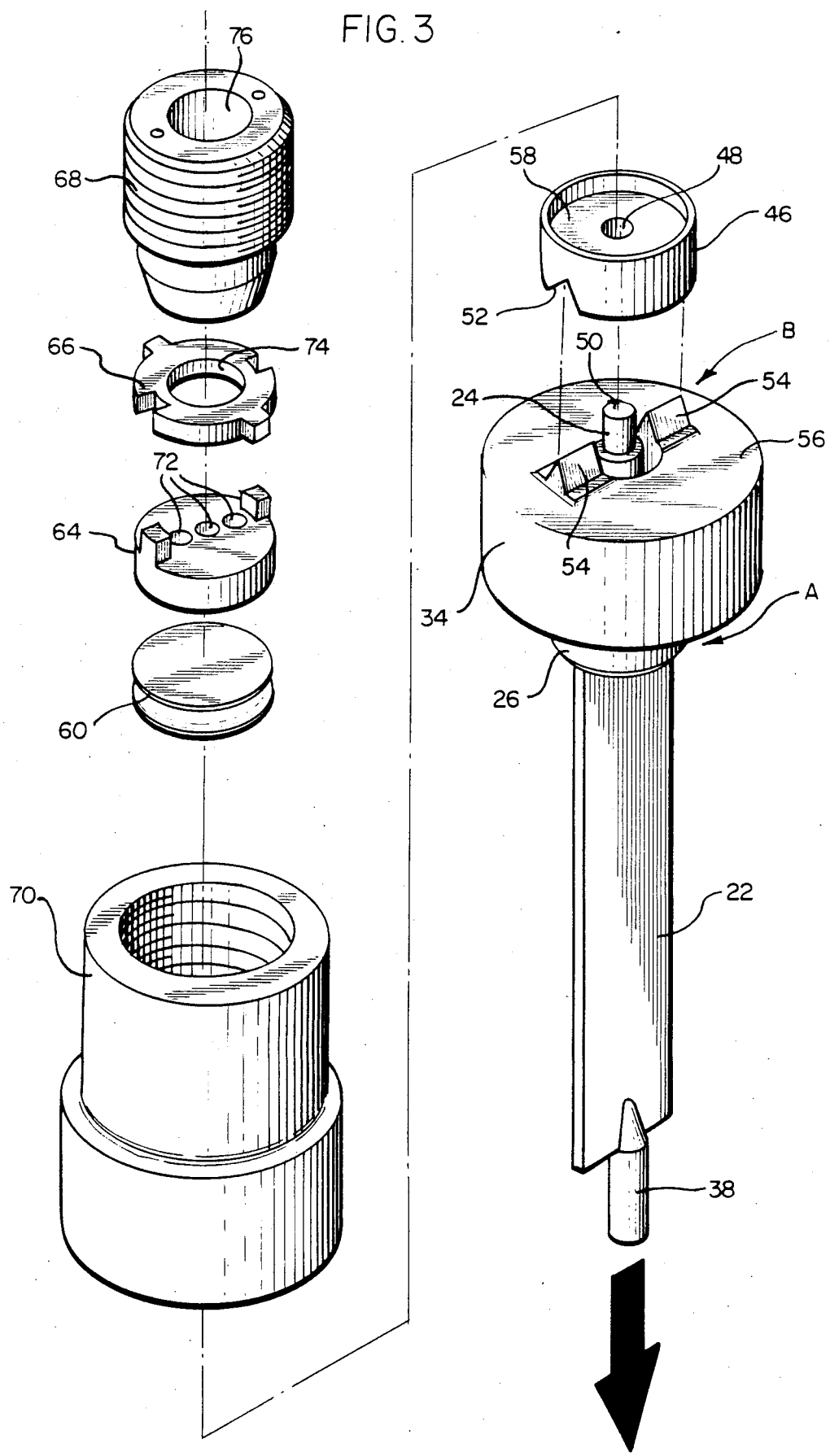

FORCE TRANSMITTING MECHANISM FOR A VORTEX FLOWMETER

This invention relates to flow metering apparatus and in particular to a force transmitting mechanism useful for a flowmeter based on the Karmen vortex principle.

BACKGROUND OF THE INVENTION

Vortex flowmeters are commercially available in which the Karmen vortex principle is used to detect the vortex shedding frequency from which the fluid flow rate may be determined. In such apparatus, it is known that a non-streamlined or bluff body placed in the flowstream will shed vortices. The passage of these vortices along a point in the flowstream, corresponding to the vortex shedding frequency, can be detected and used as a measure of the rate of fluid flow. Thus, as a vortex forms and is shed from the bluff body, a corresponding fluid pressure gradient will exist near the bluff body which can be detected by suitable detectors.

Currently available vortex flowmeters use various apparatus to detect the minute Karmen vortex pressure gradients. Some such existing sensing structure utilize strain gauges or piezoelectric sensors which are directly on the bluff body or otherwise immersed in the fluid flow path and are therefore undesirably subjected to possibly high temperature fluids. In other devices, the sensor is mounted outside of the flow path and is acted on by the bluff body or other force sensing/transmitting member passing through the fluid pipeline wall to contact the sensor. However, this configuration is disadvantageous in that hydrostatic noise from the flowing fluid is coupled through the pipeline wall to the sensors making it more difficult to detect the very minute vortex pressure gradients from the hydrostatic noise.

On the other hand, it is advantageous to have a large force collecting area for sensors desirably located outside of the pipeline, as this enhances the ability to detect the low level vortex pressure gradients. Thus, a vortex flowmeter designer placing the sensors outside of the pipeline is faced with making a design compromise between having a large force collecting area to increase the ability to detect low level pressure gradients and the desire to have a very small force collecting area to reduce the undesired transmission of hydrostatic noise from the fluid in the pipeline to the sensors outside of the pipeline.

Another disadvantage of currently available or suggested vortex flowmeters is that the force sensing member which intrudes into the flowstream must normally be very solid in order to withstand the fluid flow velocity, and yet this same structure must be very sensitive to the small force inputs due to the minute vortex created pressure gradients. Again, design compromises must be made by those skilled in the art so that such prior force sensing members are design compromises being less than desired for sensing vortex pressure gradients in the fluid and also being less than desired in transmitting such sensed pressure gradients to the sensors outside of the pipeline.

Accordingly, it is desired to provide a vortex force transmitter for use in a vortex fluid flowmeter wherein the force sensor is located outside of the pipeline; a large force collecting area can be used while reducing the sensing of hydrostatic noise; and no design compromises of the force sensing/transmitting member are required.

SUMMARY OF THE INVENTION

In accordance with the principles of the present invention, a force sensing member collects the force generated by the vortex created pressure gradients in the flowstream and passes the collected forces via a force transmitting member through a pressure retaining plate forming a plug in the pipeline sidewall and also forming a first pivot point between the force sensing member and the force transmitting member. The end of the force transmitting member includes means forming a second pivot point which in turn is in contact with a force sensor assembly such as a pair of piezoelectric crystal sensors.

The pressure retaining plate seals the fluid at the pipeline wall and permits pivoting of the force sensing/transmitting beam at the first pivot point. Both the first and second pivot points permit the force sensing member and the force transmitting member to pivot and thereby allow rotational deflection of these members in response to the vortex pressure gradients. Thus, the differential pressure of the vortices urges the force sensing and transmitting members to bend or rotationally deflect one way or the other and this bending or rotational deflection is transmitted through the two pivot points to the sensor assembly.

In a preferred embodiment rocker means including a rocker are provided at the second pivot point and in contact with the force sensor assembly. The rocker rockingly deflects in response to rotational deflection of said force transmitting member. Because the piezoelectric sensor elements are mounted to the rocker as close to the rocker centerline as possible, the maximum differential vortex pressure is detected. It is desired to mount the piezoelectric sensors as close to the centerline as possible because mounting of the sensors farther away from the centerline significantly reduces the effectiveness of detecting the vortex created pressure gradients.

In accordance with the principles of the present invention, providing of a second pivot point decouples the area of the force sensor assembly from the area of the pressure retaining plate at the pipeline wall. The rotational spring rate of the pressure retaining plate increases as the cube of its thickness in the direction taken perpendicular to its diameter. This spring rate is parasitic to the transmission of force. The area presented to the flow stream by the pressure retaining plate will be acted upon by alternating pressures common to the operation of any pipeline. By decreasing the diameter of the pressure retaining plate it can be made thinner and still retain the same static pressure load at the same time minimizing the area which can be acted upon by hydrostatic noise. Therefore, it is desirable to minimize the outer diameter of the pressure retaining plate to reduce as much as possible the transmission of undesired hydrostatic noise to the outside of the pipeline.

Providing a second pivot point in accordance with the present invention enables decoupling of the area of the pressure retaining plate and the area of the force sensor assembly so that a desired large force collecting area can be provided for the force sensor assembly. Also, the second pivot point eliminates the effects of vibration on the rocker from being sensed by the force sensor assembly.

Another significant advantage of the present invention is that the cross-sections of the force sensing member and the force transmitting members are irrelevant to the force sensing/transmitting operation and thus can be tailored to their specific tasks. The force sensing member can be shaped with a larger stream-wise depth than width to present a large surface area for the vortex pressure differential to act upon. The present invention enables the force sensing member which intrudes into the flowstream to take on any geometry necessary to produce a linear relationship between vortex shedding and force velocity and also enables the force transmitting member to be designed with a smaller cross-section to allow the pressure retaining plate to have a small outer diameter.

It should be noted that the stiffness of either the force sensing member or the force transmitting member is not directly related to the force presented to the force sensor assembly. This is of particular advantage as the mechanism can be made very robust by design and yet have excellent sensitivity to small force inputs. Also the resonant frequency of the mechanism can be tailored by adjusting the stiffness of the beams with only a secondary effect on the mechanism's sensitivity to force inputs. By adjusting the stiffness of the two members, the resonant frequency of the device can be maintained at a high enough value to make one design work in a large number of applications.

Accordingly, the present invention is significantly advantageous in allowing the sensing of force in the fluid stream with any surface area that is deemed necessary by the designer. This force is then transmitted out of the fluid stream to a less hostile environment some distance away from the fluid stream The use of a secondary pivot point and rocker arm attached to the top of the force transmitting member decouples the area of the force sensor assembly from that of the pressure retaining plate.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 3 is an exploded perspective view of the force transmitting means of FIG. 2;

DETAILED DESCRIPTION

Figure 1:
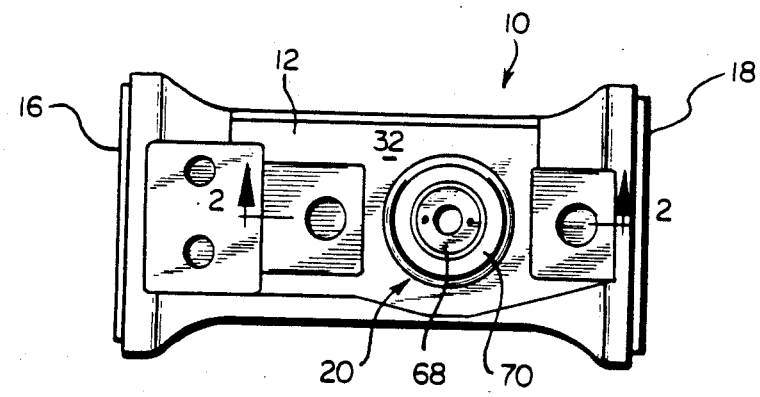
FIG. 1 is a plan view of a vortex flowmeter including force transmitting means in accordance with the present invention.
Figure 4:
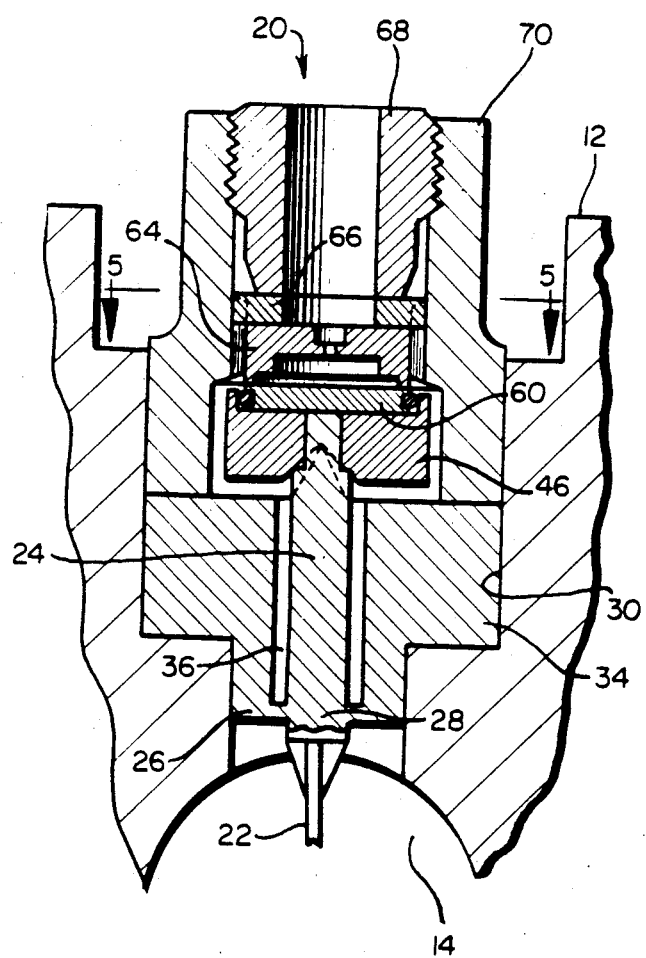
FIG. 4 is a sectional elevational view, partly fragmented taken along section lines 4—4 of FIG. 2.
Figure 5:
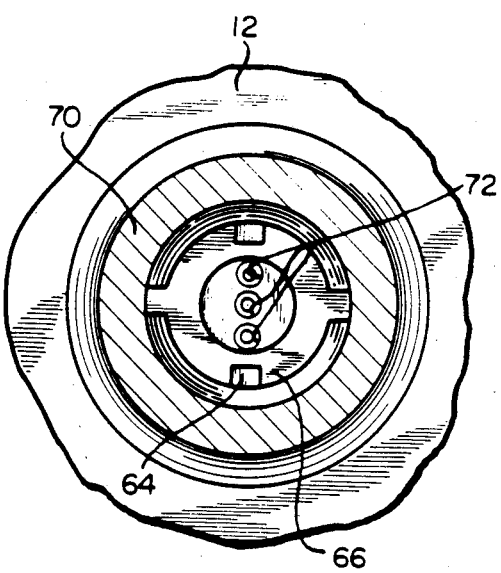
FIG. 5 is a sectional plan view taken along section lines 5—5 of FIG. 4.

Referring now to the drawings, there is illustrated a vortex flowmeter 10 having a housing 12 which includes a passageway 14 to enable fluid to pass through the housing from one end 16 to the other end 18. Within housing 12 and associated with passageway 14, there is provided a vortex force sensing and transmission means 20 which includes a force sensing beam member 22, a force transmitting beam member 24, and a plate portion 26 having a central area 28 coupling beams 22, 24.

Housing 12 includes a bore 30 which extends from the housing upper surface 32 downwardly to communicate with passageway 14. Plate portion 26 is formed as a part of a pressure retaining plug 34 which contains a circular cutout 36 to form the cylindrical force transmitting beam 24. In the preferred embodiment illustrated in the drawings, sensing beam 22, transmitting beam 24, plate 26 and plug 34 are formed as a unitary member (see FIG. 3) which is inserted into bore 30 in the housing with bottom pin 38 welded into housing aperture 40. Plug 34 is then spot welded or otherwise rigidly affixed to bore 30.

Within passageway 14, there is provided a non-streamlined or bluff body 42 in the flowstream so as to shed vortices. As a vortex forms and is shed from bluff body 42, a pressure differential or gradient will exist near this body and force sensing beam member 22 is located adjacent body 42 so as to collect the force generated by this pressure gradient. The collected force will be passed through central area 28 of plate portion 26 to force transmitting beam member 24. As can be seen from FIGS. 2 and 3, sensing beam 22 has more width than depth and is located so that the wide width portion is in line with the flowstream. Therefore, the collected forces generated by the vortex induced pressure differentials tend to rotationally deflect beam 22 which is fixed at bottom portion 44 and pivots at a first pivot point (labeled A) at central area 28 in plate portion 26. Plate portion 26 and central area 28 form a thin diaphragm-like seal of bore 30 from passageway 14 and also provide a first pivot point for rotational deflection of beam 22. A rocker member 46 includes an aperture 48 for mounting and ridged attachment to end 50 of force transmitting beam 24. The bottom surface of rocker member 46 includes a V-shaped groove 52 matching a pair of V-shaped projections 54 which project upwardly from top surface 56 of plug 34. Therefore, V-shaped projections 54 are in mating contact engagement with V-shaped groove 52.

A second pivot point (labeled B) is provided by rocker member 46 riding on V-shaped projections 54. Thus, since plug 34 is fixed rigidly to housing 12, rotational deflection of force transmitting beam 24 tends to rotate beam end 50 which is rigidly affixed to rocker member 46. This action urges rocker member 46 to translate, however, instead of a translating movement, rocker 46 tends to ride on V-shaped projections 54, thereby tending to rotate rocker 46 about the second pivot point (B).

Rocker member 46 includes a cavity 58 for mounting of a transducer assembly 60 which includes a pair of transducer elements 62. As can be seen from FIG. 2, when transducer assembly 60 is located in cavity 58, transducer elements 62 are placed in contact with the rocker assembly and are located immediately adjacent and on opposite sides of the centerline axis of force transmitting beam 24. It is desired that transducer elements 62 are located as close as possible to the centerline of beam 24 so as to detect the maximum vortex differential pressure. Since the vortex induced differential pressure decreases with increasing distance from the centerline of beam 24, it is desired to locate transducer elements 62 as close to the centerline as possible. Transducer elements 62 can comprise piezoelectric crystals which detect the differential forces on each side of the force transmitting beam centerline in response to the collected force generated by the vortex induced pressure gradient within passageway 14 sensed by sensing beam 22.

In the preferred embodiment illustrated in the drawings, transducer assembly 60 is held in intimate engaging contact with rocker member 46 by means of cup 64, thrust washer 66, and load screw 68. Thrust washer 66 isolates the rotational force imposed by load screw 68 on rocker arm 46. Sensor housing 70 is welded or otherwise affixed to housing 12. Thus, threadable engagement of load screw 68 depressingly urges transducer assembly 60 down into firm intimate engaging contact with rocker member 46. This enables transducer elements 62 to detect attempts by rocker 46 to rotate about the V-shaped projections 54 at this second pivot point due to the force on the transmitting beam 24 from force sensing beam 22. For convenience, the first pivot point at plate portion 26 has been labeled A and the second pivot point at the contact of rocker member 46 and V-shaped projections 54 has been labeled B. A series of apertures 72 in cup 64, as well as central aperture 74 in thrust washer 66 and a central aperture 76 in load screw 68 are provided to permit respective lead wires 78 from the transducer elements 62 to exit from within the housing for connection to suitable detection equipment.

Figure 2:
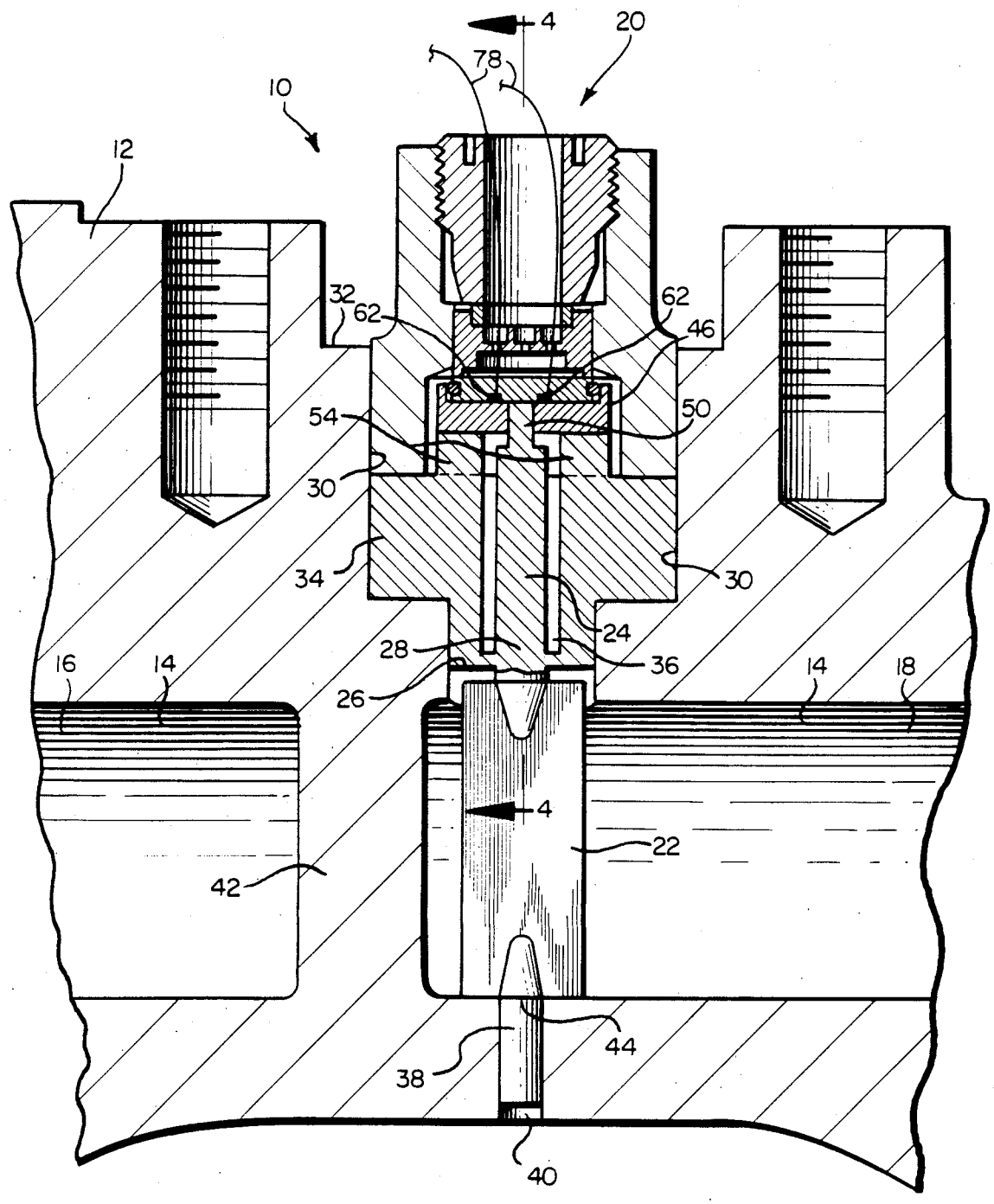
FIG. 2 is a sectional elevational view taken along section lines 2—2 of FIG. 1 and illustrating a force transmitting means in accordance with the present invention.

Various alternative embodiments may be provided in accordance with the principles of the present invention. Force sensing beam 22 may be cantilever mounted rather than fixed as shown in FIG. 2. Rather than the plate portion 26 of plug 34 forming the first pivot point A, instead, a simple thin plate can be provided having its perimeter rigidly attached to bore 30 and a central portion such as portion 28 joining together sensing beam 22 and transmitting beam 24. Also, the second pivot point B can be formed by any number of alternative techniques. For instance, the top of the force transmitting beams 24 may be of any configuration. One configuration would be in the shape of a T formed by two horizontal thin pieces of metal attached for instance to end 50 of the beam and with the perimeters of the horizontal pieces fixed to the housing so that any vibration imparted to the mechanism will not cause the top of the T to rock. This effectively eliminates the effect of vibration on the mechanism. These two pieces of metal will cause the center of the top of the T to act as a virtual pivot. Force sensors could then be attached at one or more points vertically near the cross in the T.

The illustrated and described preferred embodiment herein as well as the alternative embodiments described herein all provide the significant advantages of the present invention over conventional vortex sensing apparatus for vortex flowmeters. That is, the significant advantages of the present invention over the prior art are:

1. Enables placement of the force sensor assembly to be located some distance away from a possibly hot fluid interface;

2. The area of the force sensor assembly is decoupled from the area of the pressure retaining plate so that the amount of hydrostatic noise transmitted to the sensor assembly can be significantly reduced; and 3. The cross-section of the force sensing beam and the force transmitting beams can be tailored to their specific tasks so that the mechanism can be made very robust by design and yet have excellent sensitivity to small force inputs.

The foregoing detailed description has been given for clearness of understanding only, and no unnecessary limitations should be understood therefrom, as modifications will be obvious to those skilled in the art.

What is claimed is:

1. In a vortex flowmeter having a housing and a passageway therethrough for conducting fluid in a passageway flow path and including a vortex generator in the passageway, the improvement comprising:
   force sensing and transmission means for sensing vortex induced pressure differentials in said passageway flow path and transmitting the force generated by said vortex induced pressure differentials outside of said passageway, including a force sensing beam at one end, a force transmitting beam at the other end, and joining means therebetween;
   said force sensing beam substantially disposed in said passageway flow path adjacent said vortex generator;
   said force transmitting beam having one end projecting outside of said passageway;
   said joining means including a plate with (1) a central portion fixed respectively on opposite sides thereof to one end of said force sensing beam and to the other end of said force transmitting beam and (2) outer edges fixed to the housing at said passageway, to form a first pivot point enabling rotational deflecton of said force sensing beam responsive to said vortex induces pressure differentials;
   second pivot point means at said one end of said force transmitting beam projecting outside of said passageway to form a second pivot point enabling rotational deflection of said force transmitting beam responsive to said rotational deflection of said force sensing beam;
   said second pivot means includes a rocker member rigidly mounted to said one end of said force transmitting beam and rocker means fixed to said housing and engagingly contacting said rocker member to transform said rotational deflection of said force transmitting beam into a rocking deflection of said rocker member;
   said rocker member includes V-shaped grooves engagingly contact mating with V-shaped projections on said rocker means; and
   transducer means mounted at said second pivot point to detect said rotational deflection of said force transmitting beam corresponding to said vortex induced pressure differentials.

2. The improvement of claim 1, wherein said transducer means includes a pair of flexure sensing detectors each depressingly engaging said rocker member immediately adjacent the centerline axis of said force transmitting beam and on either side thereof.

3. The improvement of claim 2, wherein said flexure sensing detectors each comprise a piezoelectric crystal.

4. The improvement of claim 2, including load screw means threadably engaging said housing for depressingly engaging said transducer means to maintain said pair of flexure sensing detectors in intimate contact with said rocker member.

5. The improvement of claim 4, wherein said load screw means includes a load screw, threadably engaging said housing and a thrust washer between said load screw and said transducer means to isolate the rotational force imposed by the load screw on the rocker member.

6. The improvement of claim 1, wherein the other end of said force sensing beam is rigidly mounted to said housing and within said passageway.

7. The improvement of claim 1, wherein the other end of said force sensing beam is cantilever supported within said passageway by said plate.

8. Force sensing and transmitting apparatus for a vortex flowmeter comprising:
a force sensing member in the flow path for sensing vortex induced pressure differentials;
a pressure retaining plate mounted to one end of the force sensing member to provide a first pivot point;
a force transmitting member outside the flow path having one end mounted to said pressure retaining plate at said first pivot point for coupling said sensed vortex induced pressure differentials to the other end of said force transmitting member and thereby providing a rotational deflection thereof;
pivot means providing a second pivot point at the other end of said force transmitting member;
force sensing means mounted at said second pivot point for sensing said force transmitting member rotational deflection and thereby sensing said vortex induced pressure differentials;
said pivot means includes rocker means for preventing vibration of said force transmitting member from being sensed by said force sensing means; and
said rocker means includes V-shaped projections from said other end of said force transmitting member, and a rocker member with one side having V-shaped grooves matchingly receiving said V-shaped projections to transform rotational deflection of said force transmitting member into a rocking deflection of said rocker member, and wherein said force sensing means sense the rocking deflection of said rocker member and thereby sense said vortex induced pressure differentials.

9. Force sensing and transmitting apparatus according to claim 8, wherein said force sensing means includes a pair of force sensors immediately adjacent the centerline axis of said force transmitting member and on either side thereof.

10. Force sensing and transmitting apparatus according to claim 9, wherein said pair of force sensors each includes a piezoelectric crystal.

* * * * *

UNITED STATES PATENT AND TRADEMARK OFFICE
CERTIFICATE OF CORRECTION

PATENT NO. : 4,984,471
DATED : Jan. 15, 1991
INVENTOR(S) : WILLIAM J. A. STORER

It is certified that error appears in the above-identified patent and that said Letters Patent is hereby corrected as shown below:

Col. 6, line 24,    change "deflecton" to --deflection--.

Col. 6, line 25,    change "induces" to --induced--.

Signed and Sealed this

Thirtieth Day of June, 1992

Attest:

DOUGLAS B. COMER

*Attesting Officer*    Acting Commissioner of Patents and Trademarks